(12) United States Patent
Shar

(10) Patent No.: US 7,011,625 B1
(45) Date of Patent: Mar. 14, 2006

(54) METHOD AND SYSTEM FOR ACCURATE VISUALIZATION AND MEASUREMENT OF ENDOSCOPIC IMAGES

(76) Inventor: Albert Shar, 613 Dager Rd., Ambler, PA (US) 19002

( * ) Notice: Subject to any disclaimer, the term of this patent is extended or adjusted under 35 U.S.C. 154(b) by 246 days.

(21) Appl. No.: 10/460,376

(22) Filed: Jun. 13, 2003

(51) Int. Cl.
*A61B 1/04* (2006.01)
*G06K 9/36* (2006.01)

(52) U.S. Cl. ............ 600/109; 600/101; 600/921; 382/128; 382/286

(58) Field of Classification Search ............ 600/101, 600/109, 117, 118, 111, 166; 348/125, 335; 382/128, 154, 285, 286
See application file for complete search history.

(56) References Cited

U.S. PATENT DOCUMENTS 5,588,435 A * 12/1996 Weng et al. ............ 600/443
2003/0059093 A1 * 3/2003 Rosania et al. ............ 382/128
2003/0193606 A1 * 10/2003 Driscoll et al. ............ 348/335
2004/0210105 A1 * 10/2004 Hale et al. ................ 600/101
2004/0247173 A1 * 12/2004 Nielsen et al. ............ 382/154
2004/0258285 A1 * 12/2004 Hansen et al. ............ 382/224
2004/0258328 A1 * 12/2004 Adler ....................... 382/286

* cited by examiner

*Primary Examiner*—John P. Leubecker
(74) *Attorney, Agent, or Firm*—George T. Marcou; Kilpatrick Stockton LLP

(57) ABSTRACT

A method and system for accurately visualizing and measuring endoscopic images includes mapping a three-dimensional structure to a two-dimensional area, based on a plurality of endoscopic images of the structure. The method involves outlining the boundary of the region of interest in each image prior to performing a transformation into a planar image. The planar images are then stacked to form a complete planar image of the 3-D region of interest. A measurement of the area can then be performed on the enclosed outlined boundary.

10 Claims, 4 Drawing Sheets
(3 of 4 Drawing Sheet(s) Filed in Color)

METHOD AND SYSTEM FOR ACCURATE VISUALIZATION AND MEASUREMENT OF ENDOSCOPIC IMAGES

BACKGROUND OF THE INVENTION

1. Field of the Invention

The present invention pertains to endoscopic imaging. More particularly, the present invention pertains to a method and system for providing accurate visualization and measurement of endoscopic images.

2. Description of the Related Art

As known in the art, endoscopic devices such as endoscopes provide visual examination of the interior of hollow structures such as human organs, pipelines, gun barrels, etc. For example, a medical doctor can use an endoscopic device to examine Barrett's metaplasia of a patient's esophagus to track the progression of the disease; a chemical engineer can use an endoscopic device to examine the inside of a pipeline to check for erosion; or a law enforcement agent can use an endoscopic device to map out the interior of a gun barrel for ballistic fingerprinting. Today, there is virtually an endoscopic device available for every single orifice and structure that needs to be examined.

A major problem with the conventional endoscopic device is that it tends to distort the image of a region under examination, which in turn can prevent a correct assessment of the examined region. For instance, the current inability of endoscopic devices to precisely measure the area of esophageal involvement by Barrett's metaplasia precludes an accurate assessment of the natural history of the disease, and patient disposition to developing adenocarcinoma. Typically, the image distortion created by a conventional endoscopic device is caused by the lens employed in the endoscopic device and/or the curvature of the wall of the region under examination. In an attempt to rectify the image distortion problem, the inventor, with collaboration from others, developed a computer imaging method (hereinafter, "the prior imaging method") to create accurate two-dimensional color maps from endoscopic photographs. The method was based on the premise that by combining information contained in the photographed endoscopic image with a knowledge of the geometry of the region under examination and the nature of the lens distortion, a more accurate visualization of the region is possible. The method provides correction for the distortion of the endoscopic lens, calculates the center of the circular endoscopic photograph after the user identifies the perimeter of the image, recreates a three-dimensional cylindrical image of the region under examination, and "unrolls" or transforms it into a planar image. The resulting unrolled planar images are stacked in sequence to produce a two-dimensional map of the photographed model. The perimeter of the region in the two-dimensional map is then manually traced, and the area under the curve is color filled and calculated. A more detailed description of the prior imaging method is disclosed in a published article titled, "Computer Enhanced Endoscopic Visualization," which is herein incorporated by reference in its entirety.

BRIEF SUMMARY OF THE INVENTION

The inventor has discovered that the prior imaging method has a number of practical drawbacks. First, while the boundary of the region under examination, such as the boundary of a lesion in a body organ, may be easily visible in the initial photographed endoscopic image, it is often perturbed in the transformed planar image. This is because the transformation algorithm in the prior imaging method could not map data points in the transformed planar image that were not originally in the photographed endoscopic image. This drawback results in a blurring of the lesion boundary and an ill-defined lesion area in the transformed image for measurement. Second, it is not humanly or mechanically feasible to accurately focus the endoscopic device so that the center of the region under examination aligns with the center of the circular endoscopic image to be photographed. This drawback can lead to inadequate identification of the perimeter of the examined region and incorrect calculation of the region's center. The result is a less accurate three-dimensional cylindrical image of the region for transformation into the planar image.

Hence, there exists a need for a method and system to provide accurate visualization and measurement of endoscopic images that are free from at least the aforementioned drawbacks.

Accordingly, the preferred embodiments of the present invention provide a method and system for accurately visualizing and measuring a region of interest by focusing on the center of a region of interest photographed in the endoscopic image without the need for alignment of the region's center with the center of the endoscopic image.

The preferred embodiments of the present invention also provide a method and system for accurately visualizing and measuring a region of interest photographed in an endoscopic image by outlining the boundary of such region prior to performing a transformation of the endoscopic image, wherein the outlined boundary will be carried through by the transformation for subsequent assessment. This reduces the degradation in the actual outlining of the boundary due to a degradation of the image resolution after transformation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The preferred embodiments of the present invention are illustrated by way of example and not limited to the following figures, in which.

DETAILED DESCRIPTION OF THE INVENTION

Reference is now made in detail to the preferred embodiments of the present invention, illustrative examples of which are depicted in the accompanying drawings, showing a method and system for accurate visualization and measurement of endoscopic images.

Figure 1A:
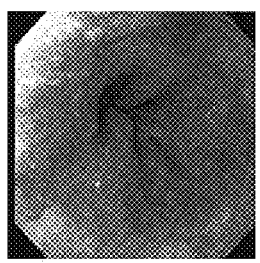
FIG. 1A depicts a digitally-scanned endoscopic image of an esophagus used as an example to describe the present invention.
Figure 1B:
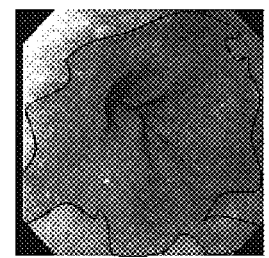
FIG. 1B depicts the endoscopic image of FIG. 1A wherein the boundary of a region of interest in the image is outlined, in accordance with an embodiment of the present invention.

According to the preferred embodiments of the present invention, multiple endoscopic images are photographed at predetermined depths of a region of interest that is under examination. Hereinafter, the present invention will be described using the esophagus as an example of the region under examination. However, as mentioned earlier, the region under examination can be virtually any structure of interest. Referring back to the multiple endoscopic images of the esophagus, each is then digitally scanned for application of the present invention. A digital camera can also be used to simultaneously photograph and digitally scan the endoscopic images. FIG. 1A shows an example of a digitally-scanned endoscopic image of an esophagus. Next, as shown in FIG. 1B, the boundary of an area of interest, e.g., a lesion, in the esophagus is outlined. This is different from the prior imaging method, wherein such boundary is outlined only after a complete transformation of the endoscopic image. According to an embodiment of the present invention, an operator can manually outline the boundary of the lesion by, for example, tracing the boundary in the digitally scanned endoscopic image using a digital pen or pointer. According to another embodiment of the present invention, a standard edge detection technique such as the Sobel edge operator can also be used to outline the boundary of the lesion.

Figure 1C:
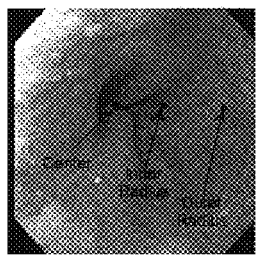
FIG. 1C depicts an identification of a center and inner and outer radii for a cylinder enclosing a region of interest in the endoscopic image of FIG. 1A, in accordance with an embodiment of the present invention.
Figure 1D:
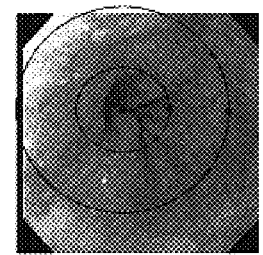
FIG. 1D depicts a cross section of a cylinder, based on the identified center and inner and outer radii shown in FIG. 1C, in accordance with an embodiment of the present invention.

Because endoscopic images produce two-dimensional representation of the three-dimensional esophagus (and the lesion in it) to a flat photograph, the present invention assumes, as with the prior imaging method, the multiple endoscopic images are approximately those of a cylinder viewed from a point on its center axis. Thus, the next step in the present invention is to determine the center, inner radius, and outer radius of such cylinder that would enclose the lesion in the esophagus. According to an embodiment of the present invention, an operator can manually identify the center, inner radius, and outer radius of the lesion on each digitally-scanned endoscopic image by, for example, applying a digital pen or pointer to the image, as done with boundary outlining mentioned earlier. FIG. 1C depicts the digitally-scanned endoscopic image of FIG. 1B with identified center, inner radius, and outer radius (the outlined boundary is not shown). According to an embodiment of the present invention, there is a minimum limit on the value of the inner radius to avoid producing measurement errors, as will be described later. FIG. 1D depicts a cross section of the resulting cylinder based on the identified center, inner radius, and outer radius shown in FIG. 1C. The region in the annulus (i.e., between the inner radius and the outer radius) is the region that is going to be transformed from a three-dimensional cylindrical image to a planar image for accurate visualization and measurement of the lesion, which is described next.

According to the preferred embodiments of the present invention, the endoscopic image depicted in FIG. 1D is first normalized so that the outside circle has a radius of 1 unit. Next, the annulus is transformed from a cylindrical image to a planar image, wherein the pixel at every point (r, θ) in the annulus is mapped to a point (x, y) according to the following transformation rule, as experimentally determined by the inventor:

$$y=(1-r)K/r,$$

where $K=\tan(k+\pi/10)$, start with k=0; and $$x=100\cdot\theta.$$

Figure 2A:
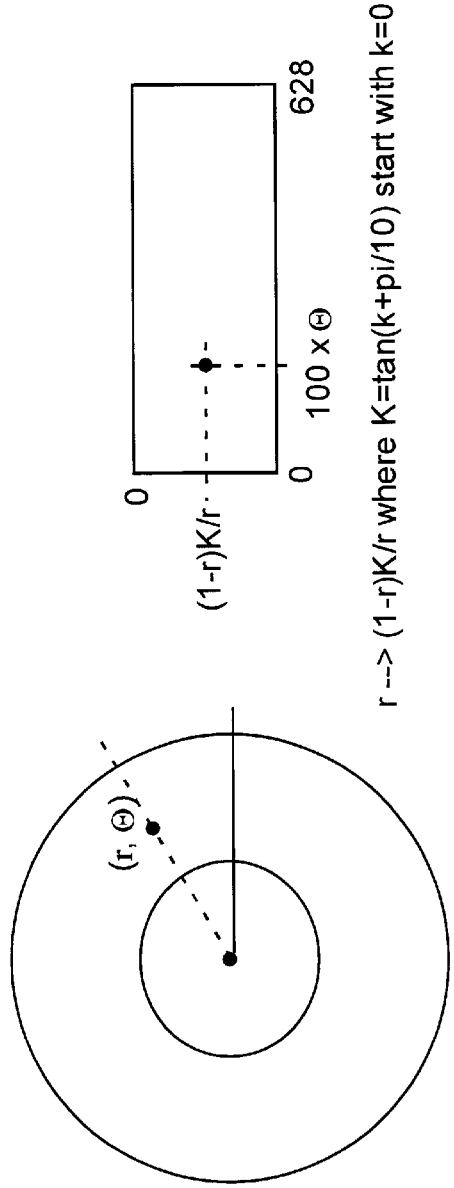
FIGS. 2A and 2B depict a transformation from the polar coordinate to the rectangular coordinate of the cylinder identified in FIG. 1D, in accordance with an embodiment of the present invention.
Figure 2B:
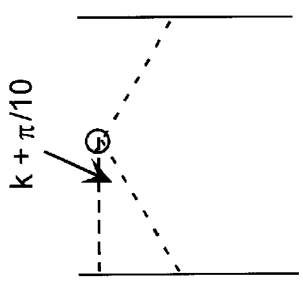

Thus, the transformation is one between polar and rectangular coordinates, as shown in FIG. 2. To compensate for the distortion that may be caused by the lens of the endoscopic device used to obtain the endoscopic images, the little k is the deviation from π/10 radians of the angle represented by the height of the lens and the highest level actually captured in the image. Hence, as shown in FIG. 2B, the little k depends upon the specific characteristics of the lens used in the endoscope. As shown in FIG. 2A, the y-axis order is from top to bottom, and θ is multiplied by 100 to properly assign pixels along the x-axis. According to an embodiment of the present invention, no calculations are done when y≧3 because higher y values can result in significant changes in calculations for relatively small changes in inputs, i.e., the transformation sensitivity begins to exceed the resolution of the image. Also, no calculations are done when the coordinate (r, θ) falls outside of the image (e.g., as shown in the top part of FIG. 1D).

Figure 3A:
FIG. 3A depicts a transformed rectangular image based on the transformation shown in FIG. 2, in accordance with an embodiment of the present invention.
Figure 3B:
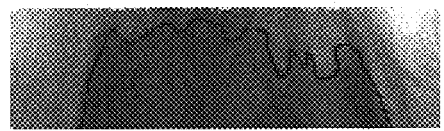
FIG. 3B depicts the transformed rectangular image shown in FIG. 3A with color values applied to each of the pixels in the image, in accordance with an embodiment of the present invention.

FIG. 3A depicts an image of the resulting target rectangle of pixels (the right rectangle shown in FIG. 2) that has been mapped from the source cylinder image (the left cylinder shown in FIG. 2). Because each digitally-scanned endoscopic image is a color image, each pixel in the source cylinder image (including the outlined boundary) is assigned a color value based on its intensity of red, green, and blue colors. For any pixel in the target rectangle that is not assigned a color value because there is no corresponding pixel in the source cylinder from which it can be mapped, such pixel is assigned a color value that is equal to its immediate left or above neighboring pixel, with the immediate left neighboring pixel preferred first. FIG. 3B depicts the resulting target rectangle of FIG. 3A with corresponding color values assigned to the pixels. As shown in FIG. 3B, the outlined boundary has been carried through by the transformation.

Figure 4:
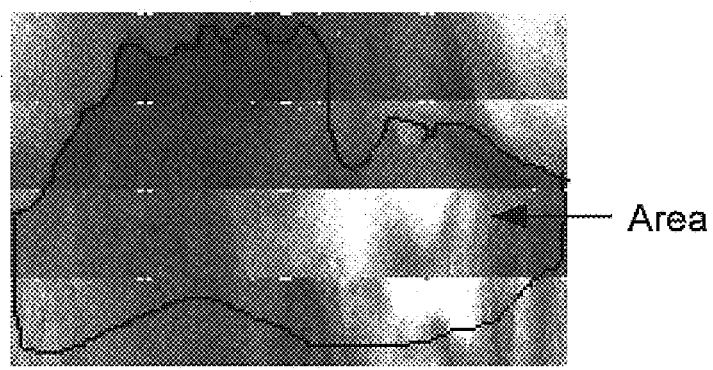
FIG. 4 depicts a complete transformed image, stacked from multiple transformed images, of the lesion in the esophagus shown in FIG. 1, in accordance with an embodiment of the present invention.

Each of the multiple endoscopic images taken of the lesion in the esophagus is transformed as described above, and the transformed images or rectangles are stacked in order of the depths at which the endoscopic images were taken. FIG. 4 depicts an example of a complete transformed image of a lesion in an esophagus that has been derived from the stacking of four transformed endoscopic images taken at different depths. For instance, the top rectangle may be the image shown in FIG. 3B (although the outlined boundary of the top rectangle in FIG. 4 is not shown to be the same as the outlined boundary in FIG. 3B). According to an embodiment of the present invention, the stacking of transformed images can be done manually or automatically using software. The software can also stack transformed images such that if there is any overlap between two adjacent images, the image with a higher picture quality at the overlapping portion will be dominant over the image with a lower picture quality.

The size of the lesion in the esophagus can now be accurately measured by measuring the area enclosed by the outlined boundary shown in FIG. 4 based on the number of pixels per each unit of measurement that has been previously calculated from the digitally-scanned endoscopic image. For instance, the endoscopic image was calculated at 50 pixels/cm or 2500 pixels/cm$^2$. As mentioned earlier, there is a minimum limit set for the value of the inner radius in FIG. 1D to avoid unreliable measurement. This minimum value is set so that when the inner radius circle is mapped to a planar image, the resulting targeted pixels on the planar image must correspond to 20% or more of the source pixels on the inner radius circle, i.e., one in five resulting targeted pixels on the planar image must correspond to an actual source pixel on the inner radius circle.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

What is claimed is:

1. A method for measuring a three-dimensional (3-D) region of interest, comprising:
    color photographing a plurality of endoscopic images of the 3-D region of interest;
    digitally scanning the endoscopic images;
    in each of the digitally-scanned endoscopic images:
        color outlining a boundary of the 3-D region of interest;
        identifying a center of the outlined 3-D region of interest, an inner circle having an inner radius extending from the center, and an outer circle having an outer radius extending from the center, wherein the area enclosed between the inner circle and the outer circle is a desired measurement area of the outlined region of interest;
        assigning each source pixel in the measurement area with a polar coordinate (r, θ) based on the center of the concentric inner and outer circles and a color value based on the pixel's color;
        transforming the measurement area into a planar image having targeted pixels with rectangular coordinates (x, y);
    stacking the planar images of the digitally-scanned endoscopic images to form a complete planar image of the 3-D region of interest; and
    measuring an area enclosed by the outlined boundary of the region of interest shown in the complete planar image.

2. The method of claim 1, wherein the step of outlining the region of interest comprises:
    manually outlining the region of interest photographed in each of the endoscopic images.

3. The method of claim 1, wherein the step of outlining the region of interest comprises:
    using an edge detection technique to outline the region of interest photographed in each of the endoscopic images.

4. The method of claim 1, wherein the step of color photographing the plurality of endoscopic images comprises:
    color photographing each of endoscopic images at a different depth of the 3-D region of interest.

5. The method of claim 4, wherein the step of stacking the planar images of the digitally-scanned endoscopic images comprises:
    stacking the planar images in order based on the depth at which each of endoscopic images was photographed.

6. The method of claim 1, wherein the planar image is a color image retaining the color value of each transformed pixel to show the outlined boundary of the region of interest.

7. The method of claim 1, wherein the step of transforming the measurement area into the planar image comprises:
    transforming each pixel in the measurement area from a polar coordinate (r, θ) to a rectangular coordinate (x, y) based on the following rules:

$y=(1-r)K/r;$ $x=100\cdot\theta;$ wherein K=tan (k+π/10), and k is a deviation from π/10 radians of the angle represented by a height of a lens used for obtaining the endoscopic image and a highest level of the 3-D region of interest that is photographed by the endoscopic image.

8. The method of claim 7, wherein the transformation of the measurement area into the planar image is only performed for values of y that are less than 3 and any pixel with a polar coordinate (r, θ) that is inside the endoscopic image.

9. The method of claim 1, wherein the step of stacking the planar images of digitally-scanned endoscopic images comprises:
    stacking the planar images such that if there is any overlapping portion between two adjacent ones of the planar images, the planar image of the two adjacent images with a higher picture quality at the overlapping portion will be dominant over the other planar image of the two adjacent images with a lower picture quality at the overlapping portion.

10. The method of claim 1, wherein a minimum value is set for the inner radius such that when source pixels on the inner radius circle are transformed to resulting targeted pixels in the planar image, the resulting targeted pixels correspond to at least 20% or more of the source pixels on the inner radius circle.

* * * * *